(12) United States Patent
Chung et al.

(10) Patent No.: US 11,994,717 B2
(45) Date of Patent: May 28, 2024

(54) PHOTONIC WAVEGUIDE AND METHOD OF FORMING THE SAME

(71) Applicant: TAIWAN SEMICONDUCTOR MANUFACTURING COMPANY LTD., Hsinchu (TW)

(72) Inventors: Ming Yang Chung, Kaohsiung (TW); Chewn-Pu Jou, Hsinchu (TW); Stefan Rusu, Sunnyvale, CA (US); Cheng-Tse Tang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 17/717,128

(22) Filed: Apr. 11, 2022

(65) Prior Publication Data

US 2023/0324609 A1    Oct. 12, 2023

(51) Int. Cl.
*G02B 6/293* (2006.01)
*G02B 6/124* (2006.01)
*G02B 6/132* (2006.01)
*G02B 6/12* (2006.01)

(52) U.S. Cl.
CPC ............ *G02B 6/124* (2013.01); *G02B 6/132* (2013.01); *G02B 6/29323* (2013.01); *G02B 6/29334* (2013.01); *G02B 2006/12038* (2013.01); *G02B 2006/12107* (2013.01)

(58) Field of Classification Search
CPC .................. G02B 6/29323; G02B 6/29334
See application file for complete search history.

(56) References Cited

U.S. PATENT DOCUMENTS

| | | | | |
|---|---|---|---|---|
| 5,416,861 A | * | 5/1995 | Koh | G06F 1/105 |
| | | | | 398/154 |
| 6,671,446 B1 | * | 12/2003 | Nishida | G02B 6/13 |
| | | | | 438/31 |
| 2010/0054662 A1 | * | 3/2010 | Hofrichter | G02B 6/30 |
| | | | | 264/1.25 |

(Continued)

FOREIGN PATENT DOCUMENTS

JP    3874959 B2 *  1/2007

OTHER PUBLICATIONS

JP-3874959-B2 English translation (Year: 2007).*

(Continued)

*Primary Examiner* — Charlie Y Peng
(74) *Attorney, Agent, or Firm* — WPAT LAW; Anthony King

(57) ABSTRACT

A method includes: determining a first material and a second material of a photonic waveguide for propagating light, the photonic waveguide having a first section and a second section arranged in a first layer and a second layer, respectively, of the photonic waveguide; determining a spacing between the first layer and the second layer; determining a parameter set of a crosstalk reduction structure, according to the spacing, the first material and a wavelength of the light, to cause insertion losses of the first section and the second section to be lower than a predetermined threshold; and forming the first and second sections with the first and second materials, respectively, the first section having the crosstalk reduction structure overlapping the second section.

20 Claims, 18 Drawing Sheets

(56) References Cited

U.S. PATENT DOCUMENTS

2020/0241205 A1* 7/2020 Kojima .................. H01S 5/142
2022/0003551 A1* 1/2022 Feshali ................. G02B 6/132

OTHER PUBLICATIONS

P. J. Bock et al., "Subwavelength grating periodic structures in silicon-on-insulator: a new type of microphotonic waveguide," Optics Express, • Sep. 2010, 18(19):20251-62.

* cited by examiner

PHOTONIC WAVEGUIDE AND METHOD OF FORMING THE SAME

BACKGROUND

Modern technology advances, such as big data, cloud computation, cloud storage, and Internet of Things (IoT), have driven exponential growth of various applications in processing and communications of data, e.g., high performance computers, data centers, and long-haul telecommunication. To address the emerging need of high data transmission rate, a modern semiconductor structure may include optical elements for providing optical data links to increase the data transmission rates of existing electrical data links. In the development of optical data transmission in the semiconductor device, the challenges of low crosstalk noise and reduced device size of an optical device have attracted a great deal of attention. Silicon photonics is one of the promising techniques for achieving a low noise and compact optical transmission architecture.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
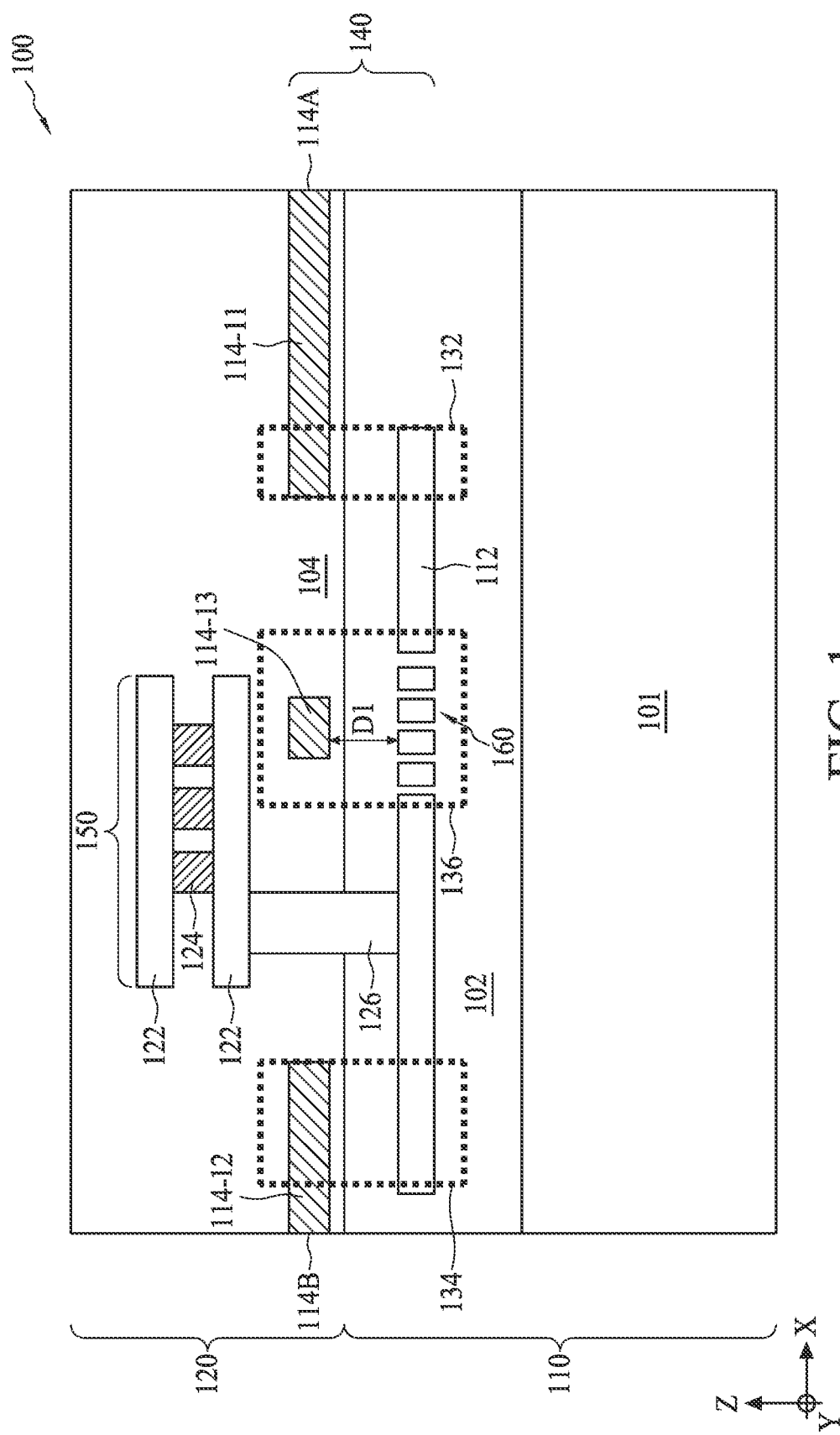
FIG. 1 is a cross-sectional view of a photonic device, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another elements) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

Embodiments of the present disclosure a photonic waveguide and a method of forming a photonic waveguide. Modern photonic waveguides may be implemented with a silicon-based material due to its low transmission loss and compatibility to existing semiconductor fabrication processes. In some applications, nitride-based dielectric materials are alternatively adopted to fabricate the photonic waveguide for its low sensitivity to temperature variations. The advantages of the two waveguide materials may not be easily enjoyed at the same time since they are not compatible within a single photonic waveguide device. The present disclosure discusses a photonic waveguide structure for addressing the crosstalk issue between the silicon-based material and the nitride-based material when both of the two materials are used in the photonic waveguide. In some embodiments, a crosstalk reduction structure, e.g., a sub-wavelength grating structure, is adopted in the silicon-based section of the photonic waveguide when the silicon-based section overlaps or intersects the nitride-based section of the photonic waveguide. As a result, the overall insertion loss of the photonic waveguide can be significantly decreased while the robustness of the photonic waveguide to temperature variations is also improved.

FIG. 1 is a cross-sectional view of a photonic device 100, in accordance with some embodiments of the present disclosure. The photonic device 100 may be an interposer device or an interconnect device used with another high data-rate or high-bandwidth semiconductor device, e.g., high-bandwidth memory, radio frequency (RF) device, or the like. The photonic device 100 includes a first substrate 110 and a second substrate 120 bonded in a stack. The photonic device 100 includes a photonic waveguide 140 arranged in the first substrate 110 and the second substrate 120.

In some embodiments, the first substrate 110 includes a base layer or a carrier substrate 101. The base layer 101 may be formed of a semiconductor material, such as bulk silicon, germanium, other suitable semiconductor materials, glass, ceramics, or the like.

The photonic waveguide 140 is configured as an interconnect structure to convey optical signals in the photonic device 100. The photonic waveguide 140 may be configured to transmit electromagnetic radiation or light as the optical signal, wherein the light has a predetermined wavelength of, e.g., 1310 nm or 1550 nm. The photonic waveguide 140 may include at least two sections in the first substrate 110 and the second substrate 120, and FIG. 1 only illustrate two example sections 112 and 114. The different sections of the photonic waveguide 140 may be arranged in different photonic layers of the respective first substrate 110 or second substrate 120. The different sections arranged in different photonic layers of the first substrate 110 and the second substrate 120 may be separate from each other and optically couple to each other for transmitting the light.

In some embodiments, the section 112 includes one or more segments connected to one another, in while each segment may extend in the XY-plane, e.g., in the direction of X-axis or Y-axis, extend in a curved manner. In some embodiments, the section 114 includes one or more segments connected to one another, in while each segment may extend in the XY-plane, e.g., in the direction of X-axis or Y-axis, or in a curved manner, One or more segments of the section 112 may intersect or overlap one or more segments of the section 114 from a top-view perspective.

In some embodiments, the first substrate 110 includes a dielectric layer 102 wrapping around the section 112 of the photonic waveguide 140. The dielectric layer 102 may be used as a cladding layer of the photonic waveguide 140 for cladding the section 112, The dielectric layer 102 may be formed of a dielectric material with a refractive index N3 less than the refractive index N1 of the section 112. The dielectric layer 102 may be formed of silicon oxide, e.g., un-doped silicate glass (USG), fluorinated silicate glass (FSG), borophosphosilicate glass (BPSG), tetraethosiloxane (TEOS), spin-on glass (SOG), high-density plasma (HDP) oxide, plasma-enhanced TEOS (PETEOS), or the like. The refractive index N1 of the dielectric layer 102 may be in a range between about 1.4 and about 1.55.

In some embodiments, the second substrate 120 includes a dielectric layer 104 wrapping around the section 114 of the photonic waveguide 140. The dielectric layer 104 may be used as a cladding layer of the photonic waveguide 140 for cladding the section 114. The dielectric layer 104 may be formed of a dielectric material with a refractive index N4 less than the refractive index of the section 114 N2. The dielectric layer 104 may be formed of silicon oxide, e.g., USG, FSG, BPSG, TEOS, SOG, HDP oxide, PETEOS, or the like. The refractive index N4 of the dielectric layer 104 may be in a range between about 1.4 and about 1.55. In some embodiments, the dielectric layer 104 has a material the same or different from the dielectric layer 102.

In some embodiments, the section 112 formed in the first substrate 110 is formed with the same or different materials from those of the section 114 formed in the second substrate 120. In some embodiments, the section 112 includes a refractive index N1 different from, e.g., greater than, the refractive index N2 of the section 114. In some embodiments, the section 112 has a refractive index N1 in a range between about 3.5 and about 4.0, e.g., 3.881. In some embodiments, the section 112 is formed of silicon, such as bulk silicon or elementary silicon. In some embodiments, portions of the section 12 is undoped or doped with impurities for facilitating optical signal modulation. In some embodiments, the section 114 has a refractive index N2 in a range between 1.8 about and about 2.2, e.g., 2.023. The section 114 may be formed of silicon nitride, such as $Si_3N_4$.

In some embodiments, the photonic device 100 further includes an interconnect structure 150 electrically coupled to the section 112. In some embodiments, the interconnect structure 150 is formed in the second substrate 120 over the section 114. The interconnect structure may include example conductive lines 122 and conductive vias 124, wherein the conductive lines 122 are extending horizontally (in the XY-plane) in the respective conductive line layers and the conductive vias 124 are extending vertically (in the Z-axis) and electrically connecting the conductive lines 122 in the neighboring conductive line layers. The interconnect structure 150 may be formed to construct a conduction path to electrically connect its overlying circuit and its underlying device (e.g., the photonic waveguide 140). In some embodiments, the conductive lines 122 and conductive vias 124 are formed of conductive materials, such as Ti, TiN, Ta, TaN, Al, Au, Ag, Cu, W, Co, alloys thereof, or the like. In some embodiments, each of the conductive lines 122 or the conductive vias 124 has a multilayer structure. The interconnect structure 150 may be electrically insulated by the dielectric layer 104.

In some embodiments, the photonic device 100 is electrically coupled to a modulator (not separately shown), wherein the modulator may be arranged within the photonic device 100 or in another device external to the photonic device 100. The modulator is configured to modulate the light propagating in the photonic waveguide 140. For example, the modulator is configured to provide a modulation signal, e.g., an RF signal, in the form of voltage or current waveforms to the first section 112 through the interconnect structure 150. The modulation signal may be transmitted to the photonic waveguide 140 through a modulation contact 126. The modulation contact 126 may extend between the first substrate 110 and the second substrate 120. In some embodiments, the first section 112 includes a doped region around the interface between the first section 112 and the modulation contact 126 to improve performance of the modulated optical signal by the modulator signal in the first section 112.

In some embodiments, the first section 112 and the second section 114 at least partially overlap or intersect. The first section 112 may extend in the direction of X-axis. The second section 114 may include multiple segments, e.g., a first segment 114-11, a second segment 114-12 and a third segment 114-13, as shown in the cross-sectional view of FIG. 1. The segments 114-11, 114-12 and 114-13 may be connected in series or in parallel, and may be formed as branches of the section 114. In some embodiments, the first segment 114-11 and the second segment 114-12 extend in the direction of X-axis, while the third segment 114-13 extends in the direction of Y-axis. In some embodiments, the first segment 114-11 includes a first portion of the second section 114 for constructing a first transition coupler 132 with a first portion of the first section 112 in a first transition coupling region of the photonic waveguide 140. In some embodiments, the second segment 114-12 includes a second portion of the second section 114 for constructing a second transition coupler 134 with a second portion of the first section 112 in a second transition coupling region of the photonic waveguide 140. In some embodiments, in the first or second transition coupler 132 or 134, the first section 112 and the second section 114 includes inverted tapers at the respective portions from a top-view perspective, in which the inverted tapers in different sections face each other and overlap from a top-view perspective for coupling the light in the vertical direction between the sections 112 and 114.

In some embodiments, the first section 112 and the second section 114 at least overlap or intersect from a top-view perspective in an overlapping region 1:36 of the photonic waveguide 140. In some embodiments, the first section 112 overlaps or intersects the third segment 114-13 of the second section 114 from a top-view perspective. In some embodiments, the first section 112 and the third segment 114-13 have an included angle of a substantially right angle from a top-view perspective.

During operation, the electromagnetic waves or the light is input into the photonic waveguide 140 from an input port 114A and output out of the photonic waveguide 140 at an output port 114B through first segment 114-11 of the second section 114, the first transition coupler 132, the first section 112, the second transition coupler 134, and the second segment 114-12 of the second section 114. The modulator is configured to transmit the modulation signal to the first section 112 through the modulation contact 126. Therefore, the optical signal in the light is modulated and transmitted to the output port 114B by way of modulation performed in the first section 112.

The first section 112 and the second section 114 are separated from each other and spaced by a spacing D1 measured in the vertical direction (Z-axis). Alternatively, the photonic layers where the first section 112 and the second section 114 reside are spaced by the spacing D1 measured in the vertical direction. As discussed previously, the first section 112 and the second section 114 may be formed in different photonic layer and with different materials, and thus their refractive indices may be different. The refractive index mismatch between the first section 112 and the second section 114 may cause undesired optical interference or crosstalk from the first section and to second section 114. On one hand, in order to avoid optical crosstalk occurring between the first section 112 and the second section 114, the spacing D1 should be determined as great as possible. On the other hand, the spacing D1 should be determined as small as possible for maintaining the coupling performance of the first transition coupler 132 and the second transition coupler 134, as well as reducing the size of the photonic waveguide 140. The spacing D1 may be determined based on the refractive indices N1, N2 of the first section 112 and the third segment 114-13 of the second section 114, respectively, the refractive index N3, N4 of the cladding layer 102 or 104, the dimensions of the first section 112 and 114, or the like. In some embodiments, the spacing D1 is in a range between about 0.2 µm and 0.5 µm, e.g., 0.35 µm.

In some embodiments, the first section 112 includes a crosstalk reduction structure 160 arranged in the overlapping region 136. When the first section 112 has a refractive index N1 greater than the refractive index N2 of the second section 114, the light transmitted in the section 114 would be interfered by the first section 112 in the overlapping region 136 despite the fact that they are spaced by the spacing D1. As a result, the overall insertion loss the photonic waveguide 140 may be degraded due to the deteriorating insertion loss in the third segment 114-13 of the second section 114. To address the crosstalk issue, the crosstalk reduction structure 160 is used to mitigate the overall insertion loss of the second section 114 by engineering the first section 112 in the overlapping region 136. The crosstalk reduction structure 160 is described in greater detail with reference to FIG. 3A.

Figure 2:
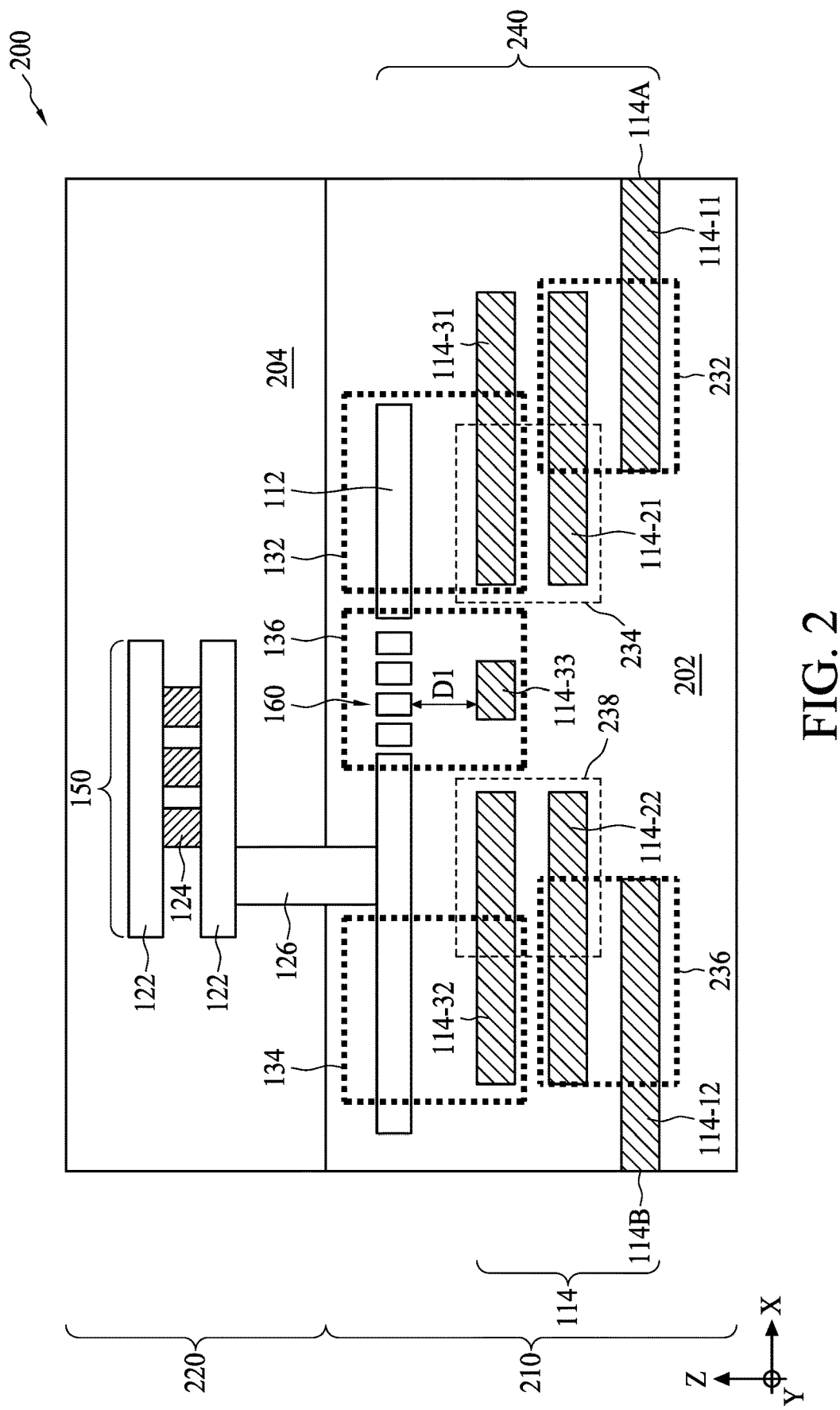
FIG. 2 is a cross-sectional view of a photonic device, in accordance with some embodiments of the present disclosure.

FIG. 2 is a cross-sectional view of a photonic device 200, in accordance with some embodiments of the present disclosure. The photonic device 200 is similar to the photonic device 100 in many aspects, and the descriptions of the similar features may be simplified herein for brevity.

The photonic device 200 includes a first substrate 210 and a second substrate 220 bonded in a stack. The photonic device 200 includes a photonic waveguide 240 arranged in the first substrate 210, and an interconnect structure 150 arranged in the second substrate 220 and electrically coupled to the photonic waveguide 240.

The photonic waveguide 240 may include at least two sections. The different sections of the photonic waveguide 240 may be arranged in different layers of the first substrate 210. The different sections arranged in different photonic layers of the first substrate 210 may be separate from each other and optically couple to each other for transmitting the light. In some embodiments, a first section 112 includes segments, in which each segment may extend in the XY-plane, e.g., in the direction of X-axis or Y-axis. In some embodiments, a second section 114 includes one or more layers, in which each layers extends in each layer of the first substrate 210 in the XY-plane, e.g., in the direction of X-axis or Y-axis. Each layer of the first section 112 further include respective segments connected to one another. In some embodiments, the first section 112 is arranged in a topmost photonic layer of the first substrate 210 over the second section 114. One or more segments of the first section 112 may intersect or overlap one or more segments of the second section 114 from a top-view perspective.

In some embodiments, the first substrate 210 includes a dielectric layer 202 wrapping around the sections 112 and 114 of the photonic waveguide 240. The dielectric layer 202 may be used as a cladding layer of the photonic waveguide 240 for cladding and separating the first section 112 and each layer of the second section 114. The dielectric layer 202 may be formed of a dielectric material similar to the dielectric layer 102 or 104, e.g., a material with a refractive index N5 less than the refractive index N1 or N2. The dielectric layer 202 may be formed of silicon oxide, e.g., USG, FSG, BPSG, TEOS, SOG, HDP oxide, PETEOS, or the like. The refractive index N5 of the dielectric layer 202 may be in a range between about 1.4 and about 1.55.

In some embodiments, the second substrate 220 includes a dielectric layer 204 wrapping around the interconnect structure 150, The dielectric layer 204 may be formed of silicon oxide, e.g., USG, FSG, BPSG, TEES, SOG, HDP oxide, PETEOS, or the like. In some embodiments, the dielectric layer 104 has a material the same or different from the dielectric layer 102, 104, or 202.

In some embodiments, the photonic device 200 is electrically coupled to a modulator (not separately shown). A modulation signal may be transmitted by the modulator to the photonic waveguide 240 through a modulation contact 126. The modulation contact 126 may extend between the first substrate 210 and the second substrate 220.

In some embodiments, the first section 112 and the second section 114 at least partially overlap or intersect. In some embodiments, the first section 112 includes at least one portion adjacent to the second section 114 so as to cause crosstalk between the two sections 112 and 114. The first section 112 may extend in the direction of X-axis. The second section 114 may include multiple layers, e.g., a first layer 114-1, a second layer 114-2 and a third layer 114-3 over one another. In some embodiments, the first layer 114-1 includes a first segment 114-11 and a second segment 114-12 extending in the direction of X-axis, the second layer 114-2 includes a first segment 114-21 and a second segment 114-22 extending in the direction of X-axis. The third layer 114-3 includes a first segment 114-31 and a second segment 114-32 extending in the direction of X-axis, and a third segment 114-33 extends in the direction nonparallel to the X-axis, e.g., in the direction of Y-axis.

In some embodiments, the first segment 114-11 of the first layer 114-1 includes a first portion for constructing a first transition coupler 232 with a first portion of the first segment 114-21 of the second layer 114-2 in a first transition coupling region of the photonic waveguide 240. In some embodiments, the first segment 114-21 of the second layer 114-2 includes a second portion for constructing a second transition coupler 234 with a first portion of the first segment 114-31 of the third layer 144-3 in a second transition coupling region of the photonic waveguide 140. In some embodiments, the first segment 114-31 of the third layer 114-3 includes a second portion for constructing a third transition coupler 132 with a first portion of a first segment of the first section 112 in a third transition coupling region of the photonic waveguide 240.

In some embodiments, the second segment 114-12 of the first layer 114-1 includes a first portion for constructing a fourth transition coupler 236 with a first portion of the second segment 114-22 of the second layer 114-2 in a fourth transition coupling region of the photonic waveguide 240. In some embodiments, the second segment 114-22 of the second layer 114-2 includes a second portion for constructing a fifth transition coupler 238 with a first portion of the second segment 114-32 of the third layer 144-3 in a fifth transition coupling region of the photonic waveguide 140. In some embodiments, the second segment 114-32 of the third layer 114-3 includes a second portion for constructing a sixth transition coupler 134 with a first portion of a second segment of the first section 112 in a sixth transition coupling region of the photonic waveguide 240.

In some embodiments, the first section 112 and the second section 114 at least overlap or intersect from a top-view perspective in an overlapping region 136 of the photonic waveguide 140. In some embodiments, first section 112 overlaps or intersects the third segment 114-33 of the third layer 114-3 from a top-view perspective. In some embodiments, the first section 112 and the third segment 114-33 have an included angle of a substantially right angle or other angles from a top-view perspective.

During operation, the electromagnetic waves or the light is input into the photonic waveguide 240 from an input port 114A and output out of the photonic waveguide 240 at an output port 114I through first segment 114-11 of the first layer 114-1, the first transition coupler 232, the first segment 114-21 of the second layer 114-2, the second transition coupler 234, the first segment 114-31 of the third layer 114-3, the third transition coupler 132, the first section 112, the sixth transition coupler 134, the second segment 114-32 of the third layer 114-3, the fifth transition coupler 238, the second segment 114-22 of the second layer 114-2, the fourth transition coupler 236, and the second segment 114-12 of the first layer 114-1. The modulator is configured to transmit the modulation signal to the first section 112 through the modulation contact 126. Therefore, the light in the first section 112 is modulated by way of the modulator and transmitted to the output port 114B.

The first section 112 and the third layer 114-3 of the second section 114 are separated from each other and spaced by a spacing D1 measured in the vertical direction (Z-axis). In some embodiments, the photonic layers where the first section 112 and the third layer 114-3 of the second section 114 reside are spaced by the spacing D1 measured in the vertical direction. In some embodiments, the spacing D1 is in a range between about 0.1 µm and about 1 µm, e.g., 0.35 In some embodiments, first section 112 includes a crosstalk reduction structure 160 arranged in the overlapping region 136.

Figure 3A:
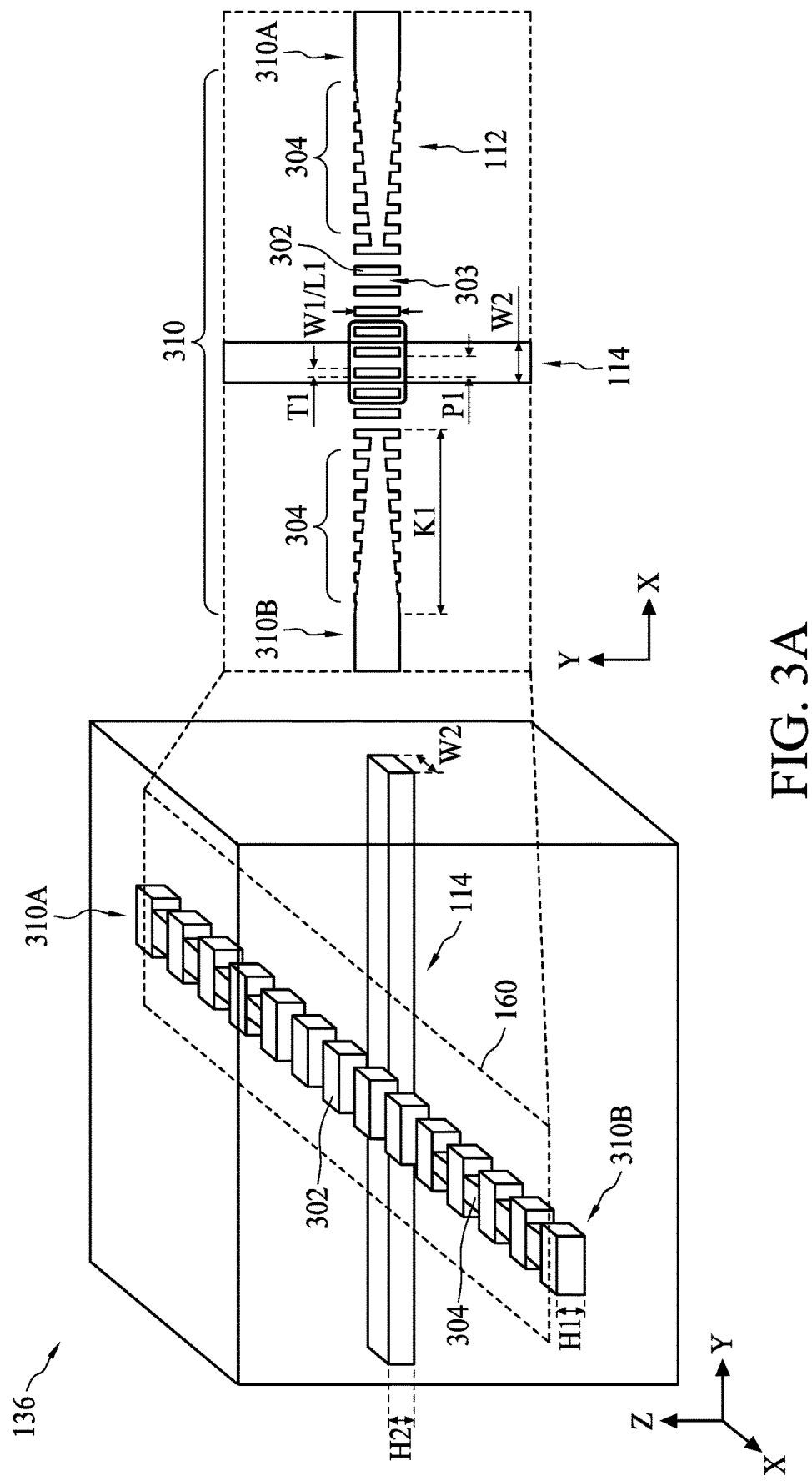
FIG. 3A is an enlarged view of an overlapping region for a sub-wavelength grating type photonic waveguide in the photonic device of FIG. 1 or FIG. 2, in accordance with some embodiments of the present disclosure.

FIG. 3A is an enlarged view of a subwavelength grating (SWG)-type photonic waveguide 140 or 240 of the photonic device 100 or 200 of FIG. 1 or FIG. 2, in accordance with some embodiments of the present disclosure. FIG. 3A shows a perspective view and a plan view of the overlapping region 136 in a left subfigure and a right subfigure, respectively. The first section 112 and the second section 114 may intersect at a right angle or other arbitrary angles.

In some embodiments, portions of the first section 112 apart from the overlapping region 136 or the second section 114 are configured as a channel-type photonic waveguide. The channel-type photonic waveguide may include a shape of cuboid or rectangular prism. In embodiments where the section 114 is configured as a channel-type photonic waveguide, the second section 114 has a width W2 measured in the X-axis. The width W2 may be in a range between about 50 nm and 2 µm, such as 1.0 µm. The second section may have a thickness H2, measured in the Z-axis, in a range between about 50 nm and 2 µm, such as 0.3 µm. In embodiments where the first section 112 is configured as a channel-type photonic waveguide, the first section 112 has a width W1 measured in the Y-axis. As shown in FIG. 3A, the SWG structure 310 of the first section 112 may be joined to the channel-type portions of the first section 112 at the two ends 310A and 310B of the overlapping region 136.

As discussed previously, since the material of the first section 112 includes a refractive index N1 greater than the refractive index N2 of the section 114, the light may experience more insertion loss in the second section 114 than in the first section 112 in the overlapping region 136 since the light has a smaller radius of light field distribution when travelling in the first section 112 than that travelling in the second section 114. In some embodiments, to reduce the amount of light dispersed out of the second section 114 to be absorbed or reflected by the first section 112, the first section 112 is engineered to form the crosstalk reduction structure 160 shown in FIG. 1 or FIG. 2 or a crosstalk reduction structure 310 shown in FIG. 3A to reduce its effective refractive index $N1_{eff}$ in the portion of the overlapping region 136. The refractive index mismatch issue may be relieved or mitigated. In some embodiments, the crosstalk reduction structure 310 is a subwavelength grating (SW G) structure overlapping the section 114 from a top-view perspective.

The SWG structure 310 can be regarded as one of the waveguide types and includes a plurality of periodic structures 302 arranged in parallel between the ends 310A, 310B of continuous portions of the section 112. In some embodiments, each of the periodic structures 302 has a shape of cuboid, rectangular prism, or the like, extending in the YZ-plane. The periodic structures 302 are spaced apart by gaps 303. The first section 112 has a width W1 measured in the direction of X-axis, in which the width W1 also serves as a length L1 of each periodic structure 302. In some embodiments, the width W1 is in a range between about 50 nm and about 5 µm, or between about 0.2 µm and about 1.0 µm, e.g., 0.54 µm. Further, the first section 112 or the periodic structures 302 has a thickness H1 measured in the direction of Z-axis. In some embodiments, the thickness H1 is in a range between about 50 nm and about 5 µm, or between about 0.2 µm and about 1.0 µm, e.g., 0.6 µm.

In some embodiments, each periodic structure 302 extends in the same direction of the second section 114, or in a direction substantially perpendicular to the direction where the first section 112 extends. The periodic structures 302 further have a pitch P1 measured in direction of X-axis. The periodic structure 302 has a width T1 measured in the direction of Y-axis, in which a duty cycle C1 of the periodic structures 302 is defined as C1=T1/P1. In some embodiments, the pitch P1 is in a range between about 50 nm and about 5 µm, or between about 0.2 µm and about 1.0 µm, e.g., 0.6 µm. In some embodiments, the duty cycle C1 is in a range between about 10% and 90%, or between about 40% and about 60%, e.g., 50%.

In some embodiments, the first section 112 further includes inverted tapers 304 around the two ends 310A, 301B of the continuous portions of the first section 112. The inverted tapers 304 extends through some of the periodic structure 302 while tapering from the ends 310A, 301B to the location where the sections 112 and 114 intersect. In some embodiments, the inverted tapers 304 is non-overlapped with the second section 114 from a top-view perspective.

Figure 3B:
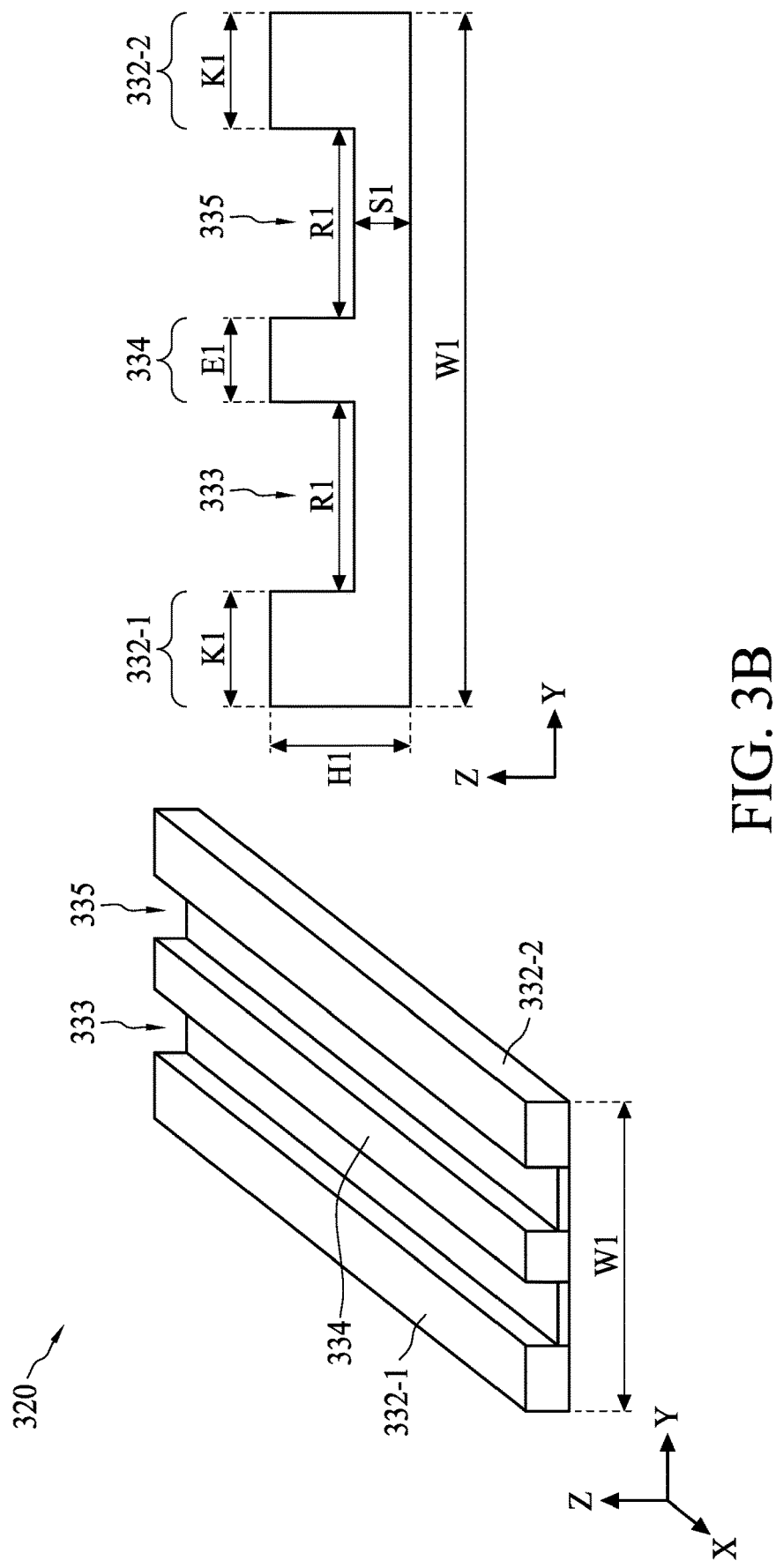
FIG. 3B shows a perspective view and a cross-sectional view of a slab-type photonic waveguide in the photonic device of FIG. 1 or FIG. 2, in accordance with some embodiments of the present disclosure.

FIG. 3B shows a perspective view and a cross-sectional view of a slab-type photonic waveguide 320 in the photonic device of FIG. 1 or FIG. 2, in accordance with some embodiments of the present disclosure. In some embodiments, portions of the first section 112 apart from the overlapping region 136 or the second section 114 are configured as the slab-type photonic waveguide 320. Referring to FIGS. 3A and 3B, the SWG structure 310 of the first section 112 may be coupled to the slab-type photonic waveguide 320 of the first section 112 at the two ends 310A and 310B of the overlapping region 136. In some embodiments, the first section 112 includes transition couplers around the end points 310A and 310B to couple the portions of the slab-type photonic waveguide and the SWG structure 310.

The slab-type photonic waveguide 320 may have a battlement shape from a cross-sectional view, in which the waveguide 320 includes three ridges 332 (including ridges 332-1 and 332-2) and 334, and two gaps or indentations 333 and 335 are formed among the ridges 322 and 324. The photonic waveguide 320 includes slab portions connecting the adjacent ridges 322 and 324, and define the bottom surfaces of the gaps 333 and 335. The ridges 332 and 334 may have rectangular shapes from a cross-sectional view. The gaps 333 and 334 may have rectangular shapes from a cross-sectional view.

In some embodiments, the photonic waveguide 320 has a thickness H1 measured in the direction of Z-axis, which is similar to the thickness H1 of the SWG-type photonic waveguide 310 or a channel type waveguide for the first section 112. In some embodiments, the photonic waveguide 320 has a width W1 measured in the direction of Y-axis, which is similar to the width W1 of the SWG structure 310. The ridges 332-1 and 332-2 may have a width K1 in a range between about 50 nm and about 5 µm, such as 0.5 µm. The ridge 334 in a central portion of the photonic waveguide 320 may have a width E1 in a range between about 50 nm and about 5 µm, such as 0.37 µm. The slab portion below the gap 333 or 335 may have a thickness S1 in a range between about 5 nm and about 5 µm, such as 0.13 µm. The gap 333 or 335 may have a width R1 in a range between about 0.1 µm and about 5 µm, such as 2 µm.

Taking the photonic waveguide 310 shown in FIG. 3A as an example, during operation, the light is transmitted between the two inverted tapers 304 through the SWG structure 310. In order to successfully transmit the light across the SWG structures 310, a parameter set of the SWG structures 310 is determined.

In some embodiments, the determination of the parameter set includes determining the dimensions of the first section 112, such as the width W1 and the thickness H1 for a channel-type photonic waveguide, and further includes determining the widths E1, K1, and R1 and the thickness S1 if a slab-type photonic waveguide is adopted. The determination of the width W1 and the thickness H1, in combination with the parameters, e.g., the wavelength of the light (denoted by $\lambda$) and the effective refractive index of the first section 112, $N1_{eff}$, which is associated with the materials of the first section 112 and the cladding layer 102 or 202, may jointly determine the light field distribution in the first section 112.

In some embodiments, the determination of the parameter set includes determining the dimensions of the second section 114, such as the width W2 and the thickness H2 for a channel-type photonic waveguide, and further includes determining the widths E1, K1, and R1 and the thickness S1 if a slab-type photonic waveguide is adopted. The determination of the width W2 and the thickness H2, in combination with the parameters, e.g., the wavelength of the light $\lambda$ and the effective refractive index of the second section 114, $N2_{eff}$, which is associated with the materials of the second section 114 and the dielectric layer 104 or 202, may jointly determine the light field distribution in the second section 114.

In some embodiments, when the first section 112 and the second section 114 includes transition couplers (e.g., portions of the transition couplers 132, 134, 232, 234, 236 and 238), the determination of the parameter set also includes determining the dimensions and shapes of the inverted tapers of the transition couplers formed on the first section 112 and the second section 114. In some embodiments, the determination of the parameter set includes determining the spacing D1 between the first section 112 and the second section 114 according to the light field distributions in the first section 112 and/or the second section 114.

In some embodiments, the spacing is determined after the dimension of the first section 112 and the second section 114 are determined. In some embodiments, the spacing D1 is determined along with the determination of the dimensions of the first section 112 and the second section 114 are determined. The determination process may be iterated between each of the first parameters including, e.g., the dimension of the first section 112, the effective refractive index $N1_{eff}$, the dimensions of the second section 114, the effective refractive index $N2_{eff}$, and the spacing D1 in various ways according to the refractive indices N1, N2 of the sections 112 and 114, respectively, the refractive index N3, N4, N5 of the dielectric layers 102, 104, 202, respectively, and the wavelength of the light $\lambda$.

In some embodiments, the determination of het parameter set further includes determining second parameters, e.g., the dimensions of the SWG structure 310, according to the first parameters of the parameter set. In some embodiments, the pitch P1 of the periodic structures 302, should be determined to avoid formation of standing waves in the SWG structure 310 due to Bragg reflection occurring in the SWG structure 310. In some embodiments, the pitch P1 is determined according to the effective refractive index $N1_{eff}$ and the wavelength of the light. In some embodiments, the pitch P1 is less than one half of the effective wavelength of the light for the waveguide mode of the first section 112, where the effective wavelength is represented as $\lambda_{eff} = \lambda/N1_{eff}$. Therefore, the pitch follows the inequality (1) shown below.

$$P1 < \lambda/(2*N1_{eff}). \tag{1}$$

The second parameters for the crosstalk reduction structure 310 may further include the width T1 or equivalently the duty cycle C1. In some embodiments, the determining of the second parameter induces tuning of the first parameters, such as tuning of the dimensions of the first section 112 or 114 as discussed above, at the time when or after the determination of the pitch P1. By appropriately determining the second parameters for the SWG structure 310, the effective refractive index $N1_{eff}$ in the overlapping region 136 can be effectively reduced to be closer to the effective refractive index $N2_{eff}$ while maintaining the optical transmission property in the first section 112. As a result, the issue of refractive index mismatch between the sections 112 and 114 can be reduced or mitigated, and the crosstalk problem can be improved.

In some embodiments, when the first section 112 adopts a channel-type or slab-type photonic waveguide in the overlapping region 136, the insertion loss of the first section 112 may be approximately zero dB, while the insertion loss of the second section 114 may exceed about 0.3 dB. As a result, the overall insertion loss of the photonic waveguide 140 or 240 is not satisfactory despite the desirable performance of the first section 112 alone. In contrast, by introduction of the SWG-type photonic waveguide 310, the insertion loss of the first section 112 in the overlapping region 136 is slightly increased to less than 0.05 dB, while the insertion loss of the second section 114 is dramatically decreased to less than about 0.09 dB in the overlapping region 136. In some embodiments, the parameter set of the SWG structure 310 is determined to cause the insertion losses of the first section 112 and the second section 114 to be lower than a predetermined threshold of insertion loss, e.g., about 0.1 dB. As a result, the overall insertion loss of the photonic waveguide 140 or 240 can be enhanced accordingly.

FIGS. 4A to 4L are cross-sectional views of intermediate stages of a method of forming a photonic device 400, in accordance with some embodiments of the present disclosure. The photonic device 400 may be similar to the photonic device 100. Although the method of forming the photonic device 400 is illustrated based on the photonic device 100, persons of ordinary skill in the art would appreciate the concepts of the method and make modifications where necessary to arrive at the photonic device 200 or other similar photonic devices.

Figure 4A:
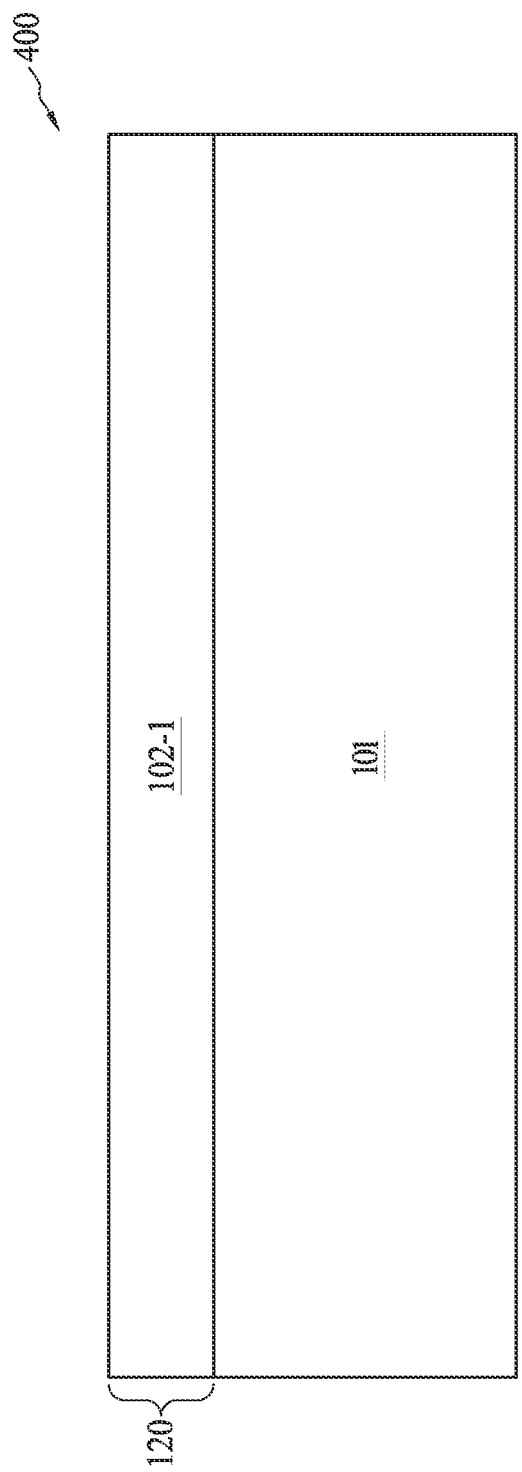
FIGS. 4A to 4L are cross-sectional views of intermediate stages of a method of forming a photonic device, in accordance with some embodiments of the present disclosure.

FIGS. 4A to 4D illustrate the formation of the first substrate 110. Referring to FIG. 4A, a base layer 101 is provided or formed. A portion 1102-1 of a dielectric layer 102 in the first substrate 110 is deposited over the base layer 101, The deposition of the portion 102-1 may be formed by physical vapor deposition (PVD), chemical vapor deposition (CVD), atomic layer deposition (ALD), thermal oxidation, spin coating, or other suitable deposition methods. In some embodiments, a planarization operation, e.g., chemical mechanical polishing (CMP), mechanical grinding, or the like, may be performed to planarize the surface of the dielectric layer 102.

Figure 4B:
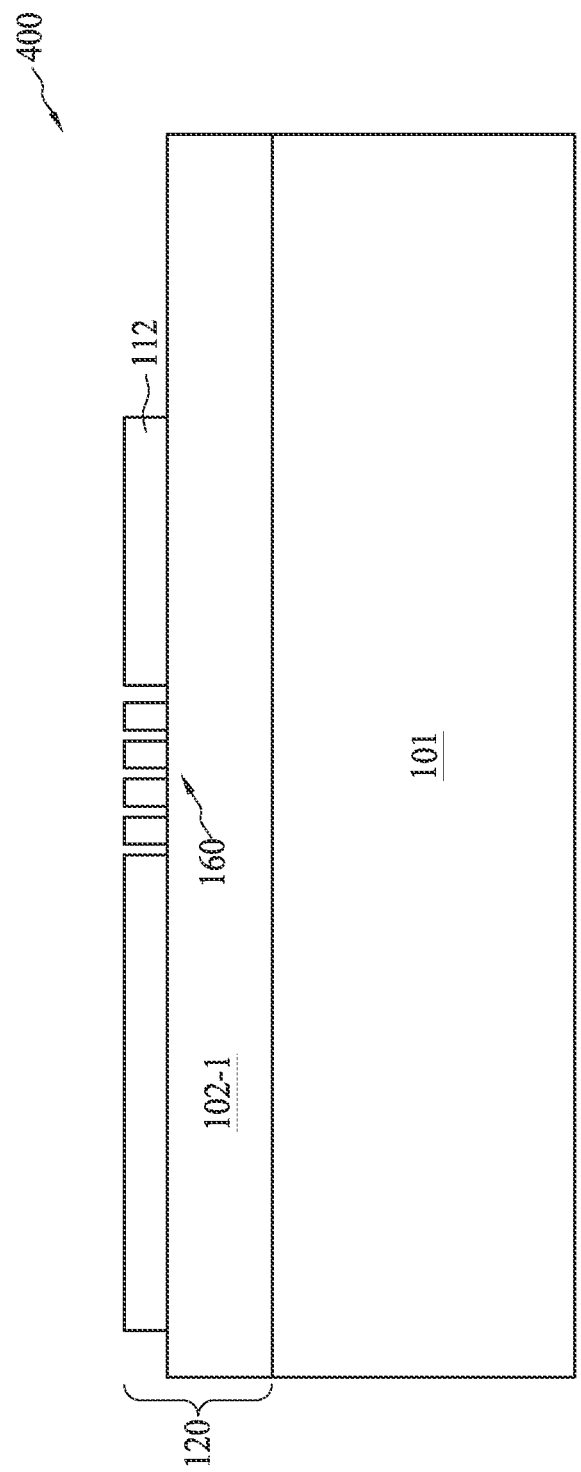

Referring to FIG. 4B, a first section 112 is deposited or disposed over the surface of the dielectric layer 102-1. The deposition of the first section 112 may be performed by CVD, PVD, ALD, or other suitable deposition methods. In some embodiments, a material of the first section 112, e.g., silicon, is deposited over the portion 102-1. Subsequently, the first section 112 is patterned to form a crosstalk reduction structure or a SWG structure 160 in the first section 112. In some embodiments, the patterning of the first section 112 into the SWG structure 160 includes a photolithography operation to form a mask layer using a photomask and etching the first section 112 with the mask layer serving as the etching mask. The dimensional accuracy of the SWG structure 160 is determined by the fidelity of the photolithography and etching operations. The configurations and dimensions of the SWG structure 160 are discussed with reference to FIG. 3A.

Figure 4C:
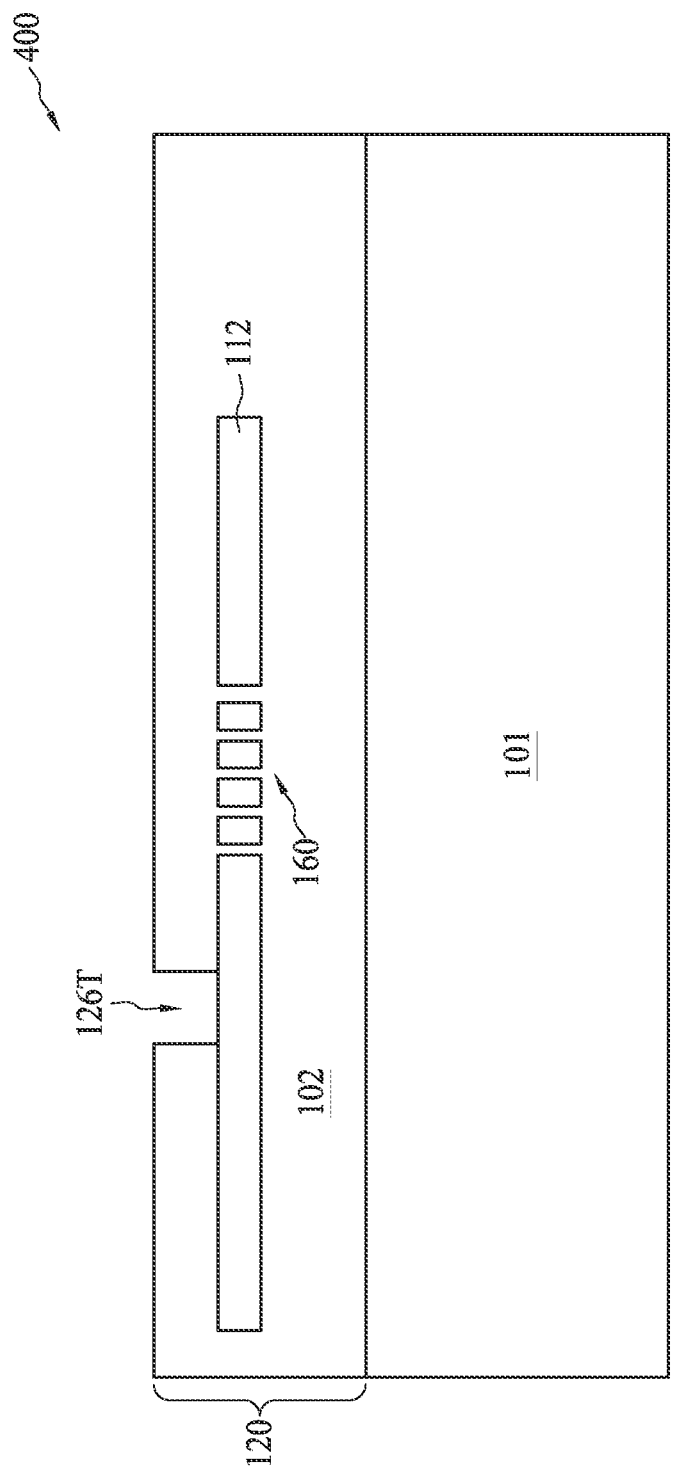

FIG. 4C illustrates the forming of the complete dielectric layer 102 over the section 112. The dielectric layer 102 is deposited to cover the entire first section 112. The forming method and materials of the remaining portions of the dielectric layer 102 are similar to those for forming the portion 102-1 of the dielectric layer 102. The thickness of the dielectric layer 102 between the upper surface of the dielectric layer 102 and the upper surface of the section 112 may determine the spacing D1 between the sections 112 and 114.

The dielectric layer 102 is patterned to form a trench 126T from the surface of the dielectric layer 102. The trench 126T exposes an upper surface of the first section 112. The patterning operation of the trench 126T may include photolithography and etching operations. In some embodiments, the etching operation includes a dry etch, a wet etch, a reactive ion etch (RIE), or the like.

Figure 4D:
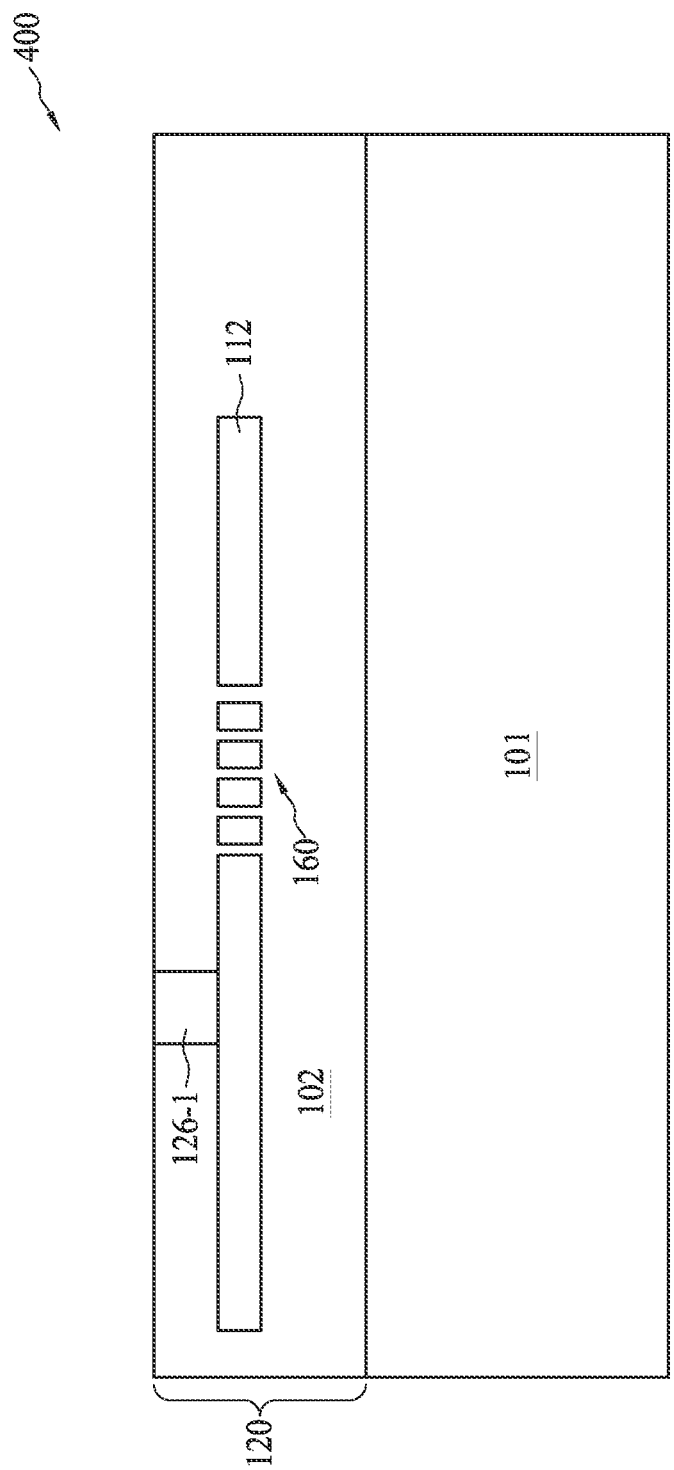

Referring to FIG. 4D, a first section 126-1 of a modulation contact 126 is formed in the trench 126T. The first section 126-1 of the modulation contact 126 may be deposited in the trench 126T by CVD, PVD, ALD, sputtering, or other suitable deposition methods. In some embodiments, a planarization operation may be performed to remove excess materials of the first section 126-1 of the modulation contact 126 over the surface of the dielectric layer 102 and level the surface of the dielectric layer 102 with the first section 126-1 of the modulation contact 126.

Figure 4E:
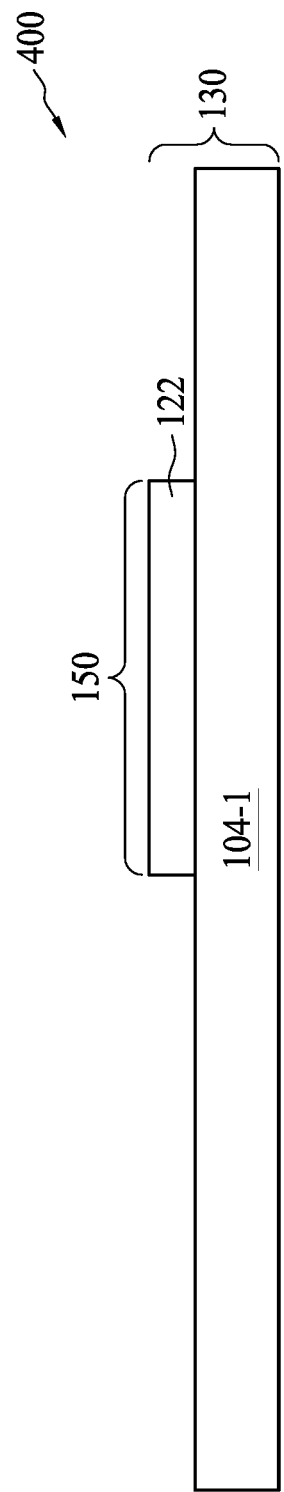

FIGS. 4E to 4K illustrate the formation of the second substrate 120. Referring to FIG. 4E, a portion 104-1 of the dielectric layer 104 is deposited over a carrier substrate (not separately shown). The materials and method of forming the portion 104-1 are similar to those of forming the dielectric layer 102. Subsequently, a first conductive line 122 is deposited and patterned over the surface of the portion 104-1. The deposition of the first conductive line 122 may be performed by CVD, PVD, ALD or other suitable deposition methods. The patterning operation of the first conductive line may include photolithography and etching operations.

Figure 4F:
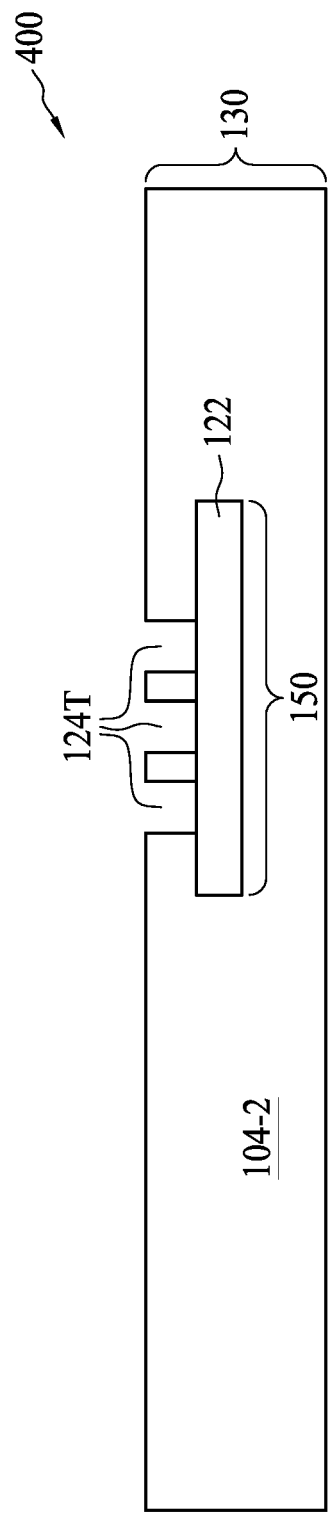

Referring to FIG. 4F, the dielectric layer 104 is thickened by a deposition operation to form a portion 104-2 to encapsulate or surround the first conductive line 122. The portion 104-2 may be planarized, e.g., using CMP. Subsequently, one or more trenches 124T are formed in the portion 104-2 and expose the surface of the first conductive line 122. The formation of the trenches 124T may include photolithography and etching operations.

Figure 4G:
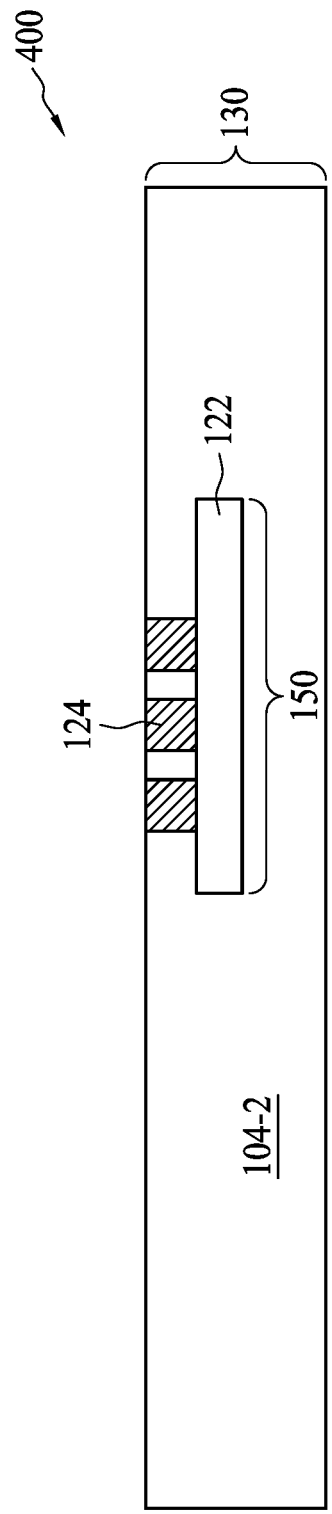
Figure 4H:
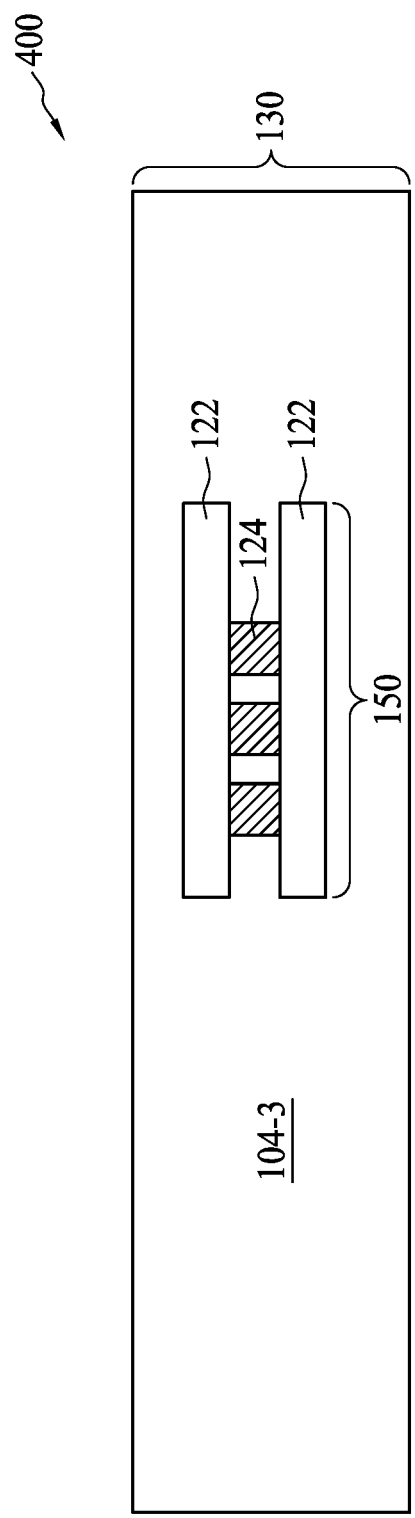

Referring to FIG. 4G, conductive vias 124 are formed in the trenches 124I and electrically coupled to the first conductive line 122 using CND, PVD, ALD, or other suitable methods. Referring to FIG. 4H, a second conductive line 122 and a portion 104-3 of the dielectric layer 104 are successively formed over the conductive vias 124. The configuration, material and method of forming of the second conductive line 122 are similar to those of forming the first conductive line 122. The configuration, material and method of forming of the portion 104-3 are similar to those of forming the dielectric layer 102.

Figure 4I:
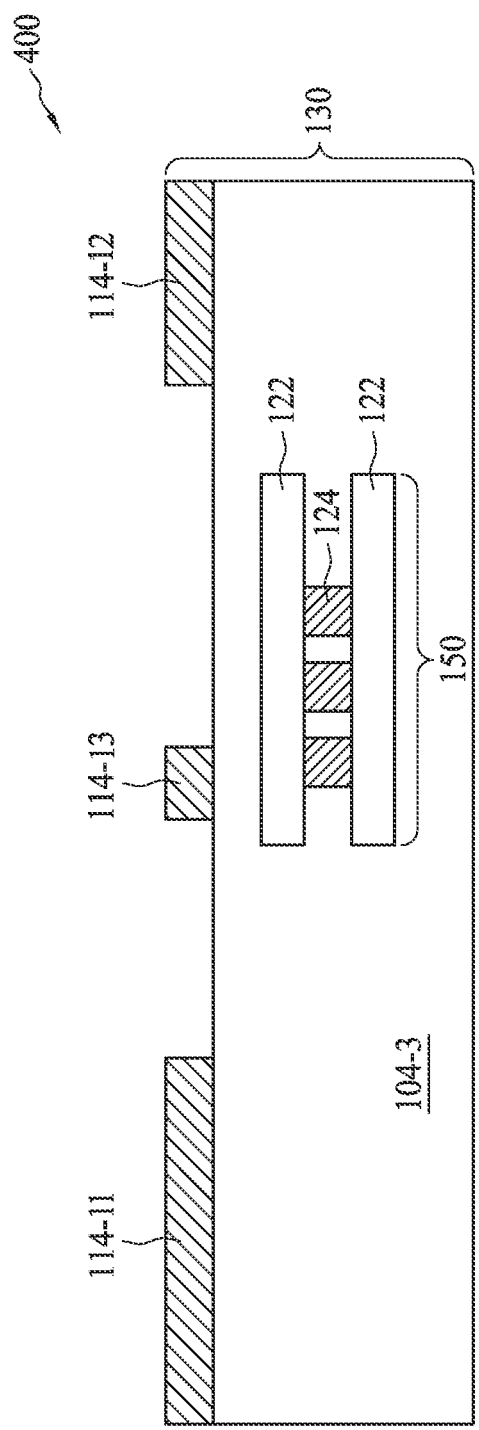

FIG. 4I illustrates the formation of the second section 114, including at least the segments 114-11, 114-12 and 114-13. The deposition of a material layer of the second section 114 may include CVD, PVD, ALD, nitridation, spin-on coating, or other suitable deposition methods. A patterning operation may be performed to pattern the material layer of the second section 114 into the pattern of the section 114.

Figure 4J:
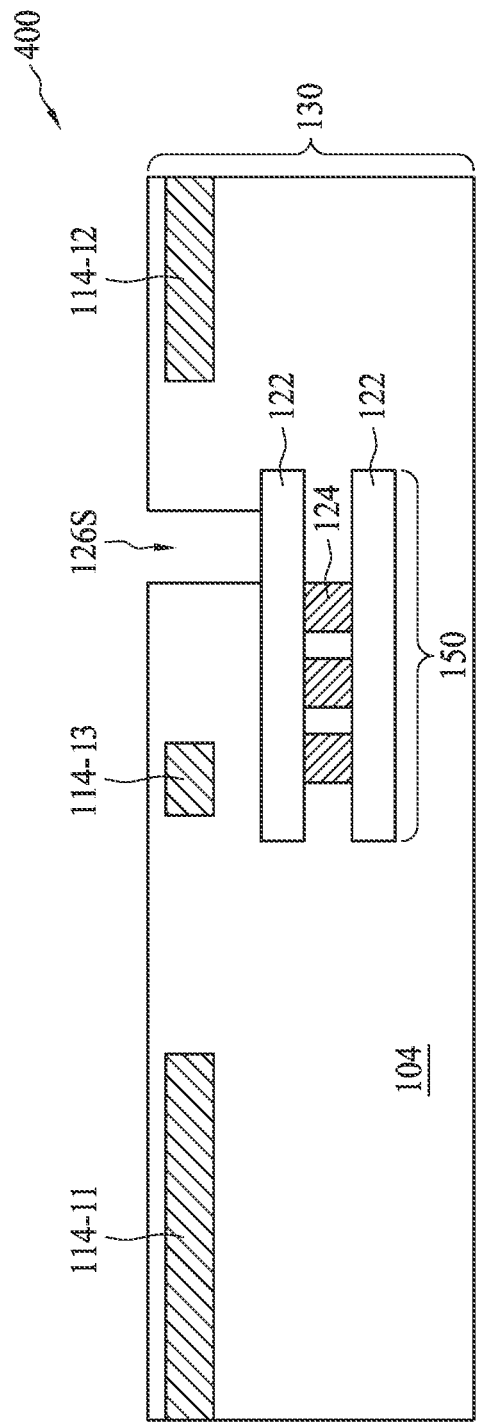

Referring to FIG. 4J, a deposition operation is performed to form the complete dielectric layer 104 to encapsulate or surround the second section 114. The dielectric layer 104 may be planarized, e.g., using CMP. The thickness of the dielectric layer 104 between the upper surface of the dielectric layer 104 and the upper surface of the section 114 may determine the spacing D1 between the sections 112 and 114. Subsequently, a trench 126S is etched in the dielectric layer 104 and exposes the surface of the second section 114. The formation of the trench 126S may include photolithography and etching operations, and may be similar to the method of formation of the trench 126T.

Figure 4K:
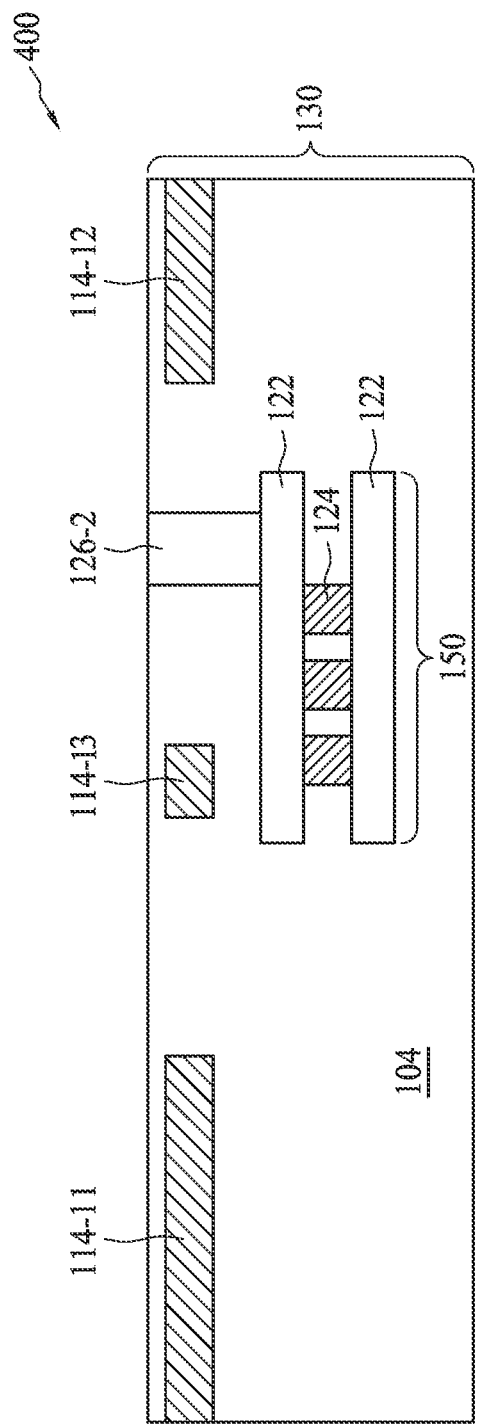

Referring to FIG. 4K, a second section 126-2 of the modulation contact 126 is formed in the trench 126S. The second section 126-2 of modulation contact 126 may be deposited in the trench 126S by CVD, PVD, ALD, sputtering, or other suitable deposition methods. In some embodiments, a planarization operation may be formed to remove excess materials of the second section 126-2 of the modulation contact 126 over the surface of the dielectric layer 104, and to level the surface of the dielectric layer 104 with the second section 126-2 of the modulation contact 126.

Figure 4L:
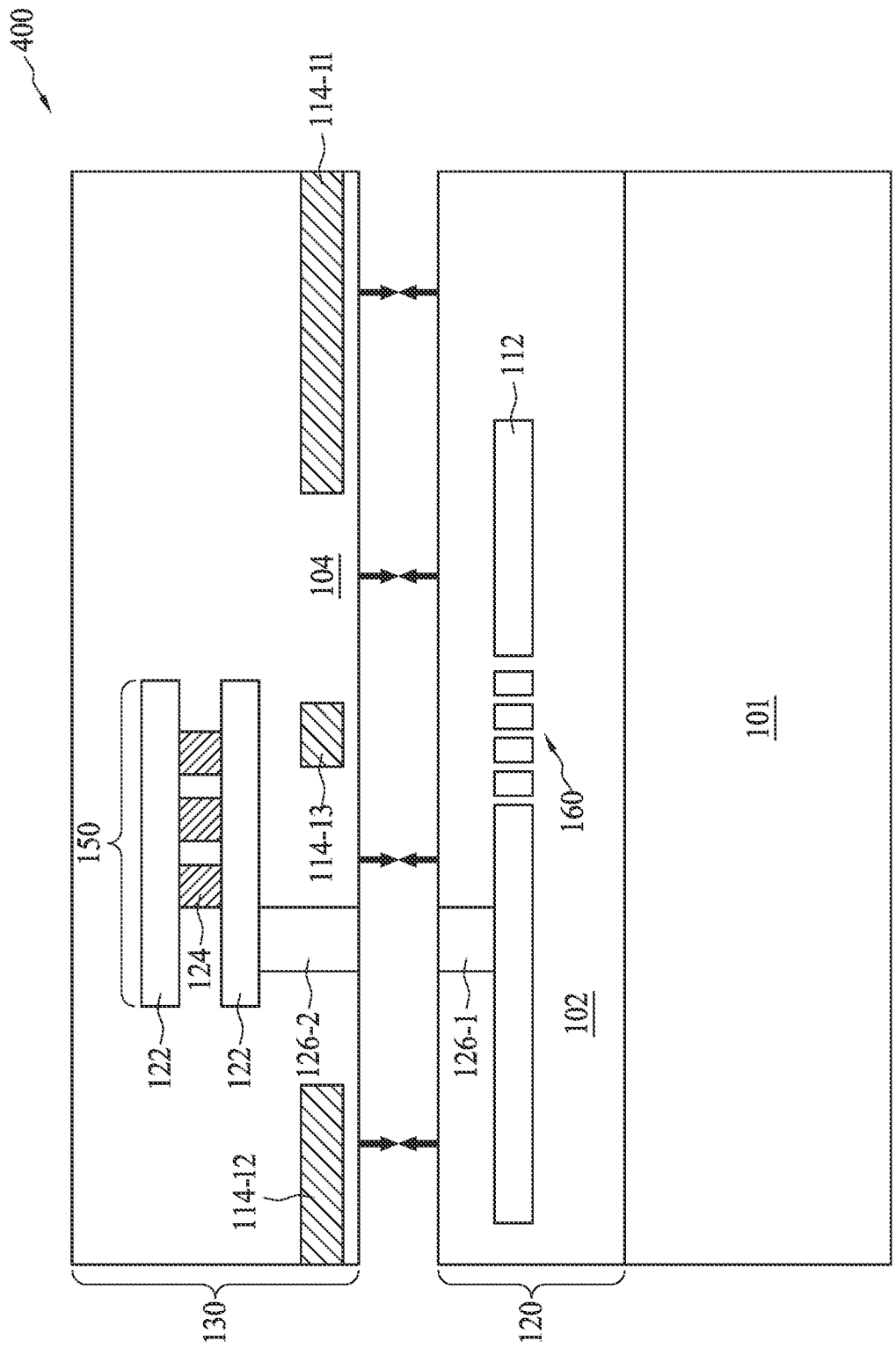

Referring to FIG. 4L, one of the first substrate 110 and the second substrate 120 is flipped, and the first substrate 110 and the second substrate 120 are bonded to form the photonic device 400. The first section 126-1 and the second section 126-2 of the modulation contact 126 are bonded to each other to form the modulation contact 126 through the bonding operation. In some embodiments, the carrier substrate is removed or stripped during or after the bonding operation. In some embodiments, the bonding operation is performed by compressive bonding, fusion bonding, or solid-liquid inter-diffusion bonding (SLID). In some embodiments, a thermal annealing is involved in the bonding operation to fuse the dielectric layer 102 with the dielectric layer 104 when the first substrate 110 is bonded with the second substrate 120.

Figure 5:
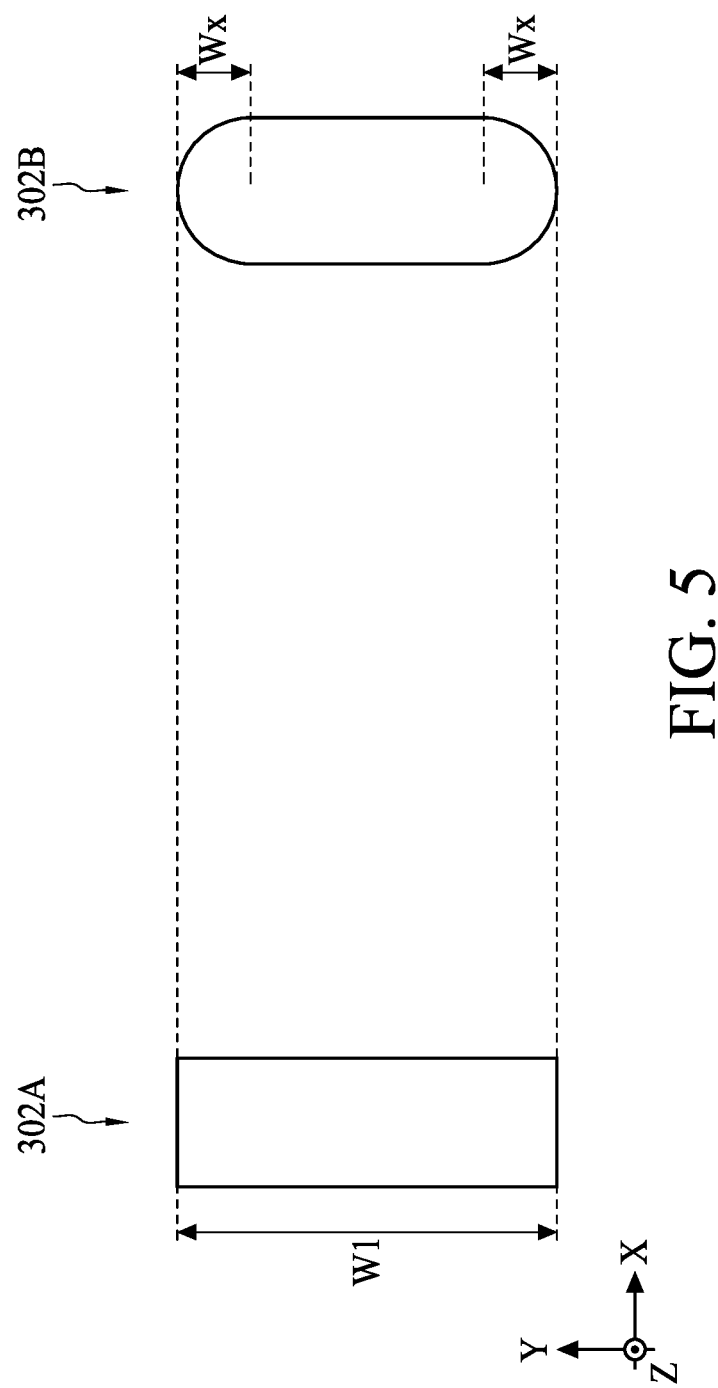
FIG. 5 shows top views of a sub-wavelength grating structure, in accordance with some embodiments of the present disclosure.

FIG. 5 shows top views of the SWG structure 310, in accordance with some embodiments of the present disclosure, Referring to a top view 302A, which is a top view of a single periodic structure 302 of the SWG structure 310 in a layout design stage. The periodic structure 302 of the design layout as shown in the top view 302A has an ideal rectangular shape from a top-view perspective during the design stage, and thus the corners of the periodic structure 302 exhibits substantially right angles. Referring to a top view 302B, which is a top view of a single periodic structure 302 of the SWG structure 310 in a manufactured photonic device, e.g., the photonic device 100, 200 or 400. The periodic structure 302 of the manufactured photonic device as shown in to top view 302B has a non-ideal rectangular shape from a top-view perspective in the manufactured device. For example, the top view 302B has substantially straight sidewalls with rounded corners. This may be due to the process limitations of the patterning operations of the periodic structure 302, e.g., in a photolithography or etching operations for forming the photomask of the first section 112, as discussed with reference to FIG. 4B. In some embodiments, the round corners of the periodic structure 302 in the top view 302B has a width Wx measured in the direction of Y-axis, in which a width ratio of Wx/W1 is in a range between about 0.01% and about 5%, between 0.1 and 5%, or between about 1% and about 5%. In some embodiments, the determination of the parameter set of the SWG structure 310 is further according to the process variations or shape variation of the periodic structure 302, e.g., the top view 302B, by taking into account the width Wx.

Figure 6:
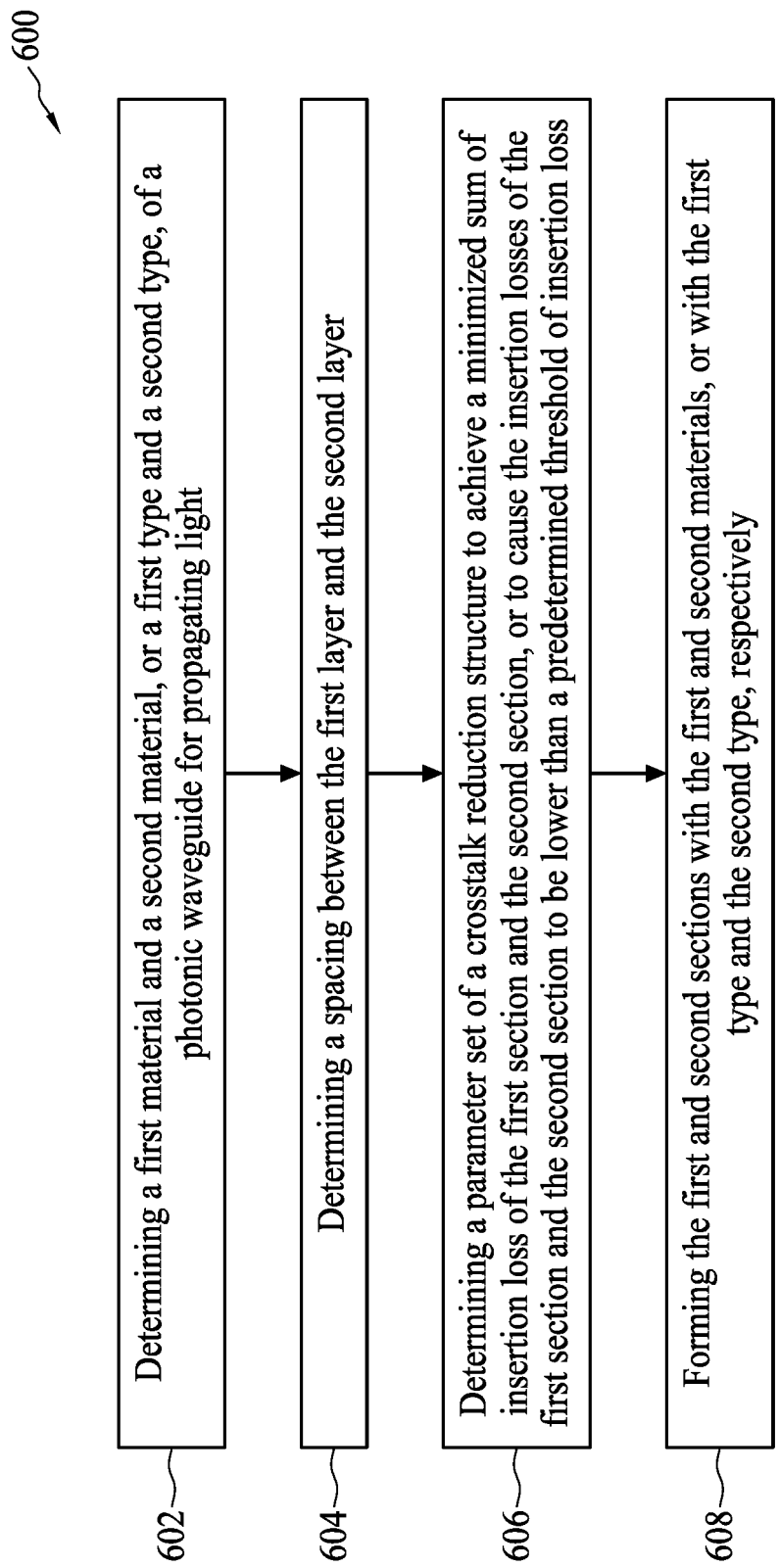
FIG. 6 is a flowchart of a method of manufacturing a photonic device, in accordance with some embodiments of the present disclosure.

FIG. 6 is a flowchart of a method 600 of manufacturing a photonic device, in accordance with some embodiments of the present disclosure. It should be understood that additional steps can be provided before, during, and after the steps shown in FIG. 6, and some of the steps described below can be replaced or eliminated in other embodiments of the method 600. The order of the steps may be interchangeable.

At step 602, a first material and a second material of a photonic waveguide are determined for propagating light. Alternatively or additionally, a first type and a second type of the photonic waveguide are determined for propagating the light. In some embodiments, the photonic waveguide includes a first section and a second section arranged in a first layer and a second layer, respectively, of the photonic waveguide. Each of the first type and the second type of photonic waveguide can be a channel type, a slab type or an SWG type.

At step 604, a spacing between the first layer and the second layer is determined. In some embodiments, the spacing between the first section and the second section is determined.

At step 606, a parameter set of a crosstalk reduction structure is determined to achieve a minimized sum of insertion loss of the first section and the second section, either in the linear scale or in dB scale. In some embodiments, the parameter set is determined to cause the insertion losses of the first section and the second section to be lower than a predetermined threshold of insertion loss. The parameter set may include first parameters, e.g., dimensions of the first section and the second section, the spacing, and the like, and include second parameters, e.g., dimensions of the crosstalk reduction structures, such as the pitch, the cycle, the width, and the thickness of the periodic structures in the crosstalk reduction structure.

In some embodiments, the parameter set of the crosstalk reduction structure is determined through numerical simulation. In some embodiments, the parameter set may be determined according to at least one of the properties, e.g., the first material (such as the first material's effective refractive index), the second material (such as the second material's effective refractive index), the first type, the second type, the spacing, a wavelength of the light, a material of a cladding layer of the photonic waveguide (such as the cladding layer's refractive index). In some embodiments, the parameter set is determined to achieve a minimized insertion loss of the section with a lower effective refractive index, e.g., the second section.

At step 608, the photonic waveguide is fabricated by forming the first and second sections with the first and second materials, or with the first type and the second type, respectively. In some embodiments, the crosstalk reduction structure is formed in the section with the greater effective refractive index, e.g., the first section 112.

According to an embodiment, a method includes: determining a first material and a second material of a photonic waveguide for propagating light, the photonic waveguide having a first section and a second section arranged in a first layer and a second layer, respectively, of the photonic waveguide; determining a spacing between the first layer and the second layer; determining a parameter set of a crosstalk reduction structure, according to the spacing, the first material and a wavelength of the light, to cause insertion losses of the first section and the second section to be lower than a predetermined threshold; and forming the first and second sections with the first and second materials, respectively, the first section having the crosstalk reduction structure overlapping the second section.

According to an embodiment, a method includes: determining a first type and a second type of a photonic waveguide for propagating light, the photonic waveguide having a first section and a second section arranged in a first layer and a second layer, respectively, of the photonic waveguide; determining a spacing between the first layer and the second layer; determining a parameter set of a crosstalk reduction structure, according to the first type, the second type, the spacing, and a wavelength of the light, to achieve a minimized sum of insertion loss of the first section and the second section; and forming the first and second sections with the first and second types, respectively, in an overlapping region of the first section and the second section.

According to an embodiment, a semiconductor device includes a photonic waveguide for transmitting light in a substrate. The photonic waveguide structure includes a first section formed of a first material and arranged in a first layer of the photonic waveguide, and a second section formed of a second material different from the first material and arranged in a second layer of the photonic waveguide. One of the first section and the second section has a plurality of periodic structures overlapping the other from a top-view perspective.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   determining a first material and a second material of a photonic waveguide for propagating light, the photonic waveguide comprising a first section and a second section arranged in a first layer and a second layer, respectively, of the photonic waveguide;
   determining a spacing between the first layer and the second layer;
   determining a parameter set of a crosstalk reduction structure, according to the spacing, the first material and a wavelength of the light, to cause insertion losses of the first section and the second section to be lower than a predetermined threshold; and
   forming the first and second sections with the first and second materials, respectively, the first section comprising the crosstalk reduction structure overlapping the second section.

2. The method according to claim 1, wherein the crosstalk reduction structure comprises a subwavelength grating structure.

3. The method according to claim 2, wherein the parameter set comprises a width, a pitch and a cycle of the subwavelength grating structure.

4. The method according to claim 3, wherein the determining of the parameter set comprises determining the pitch to be less than one half of a wavelength of the light divided by an effective refractive index of the first material.

5. The method according to claim 1, further comprising depositing a cladding layer cladding the first section and the second section, wherein the first and second materials have respective first and second refractive indices, and the cladding layer has a third refractive index, wherein the second refractive index is less than the first refractive index and greater than and the third refractive index.

6. The method according to claim 1, wherein the first material is silicon, and the second material is silicon nitride.

7. The method according to claim 1, wherein the first section extends in a first direction substantially perpendicular to a second direction in which the second section extends in an overlapping region of the photonic waveguide.

8. The method according to claim 1, wherein the second section has a channel-type photonic waveguide or a slab-type photonic waveguide in an overlapping region of the photonic waveguide.

9. The method according to claim 1, further comprising forming a transition coupler in the first section and the second section to couple the light between the first section and the second section.

10. The method according to claim 1, wherein the determining of the parameter set causes an insertion loss due to the crosstalk reduction structure to be greater than an insertion loss of the first section given the crosstalk reduction structure being formed of a channel-type or slab-type photonic waveguide.

11. A semiconductor device, comprising:
    a photonic waveguide for transmitting light in a substrate, the photonic waveguide comprising:
      a first section formed of a first material and arranged in a first layer of the photonic waveguide; and
      a second section formed of a second material different from the first material and arranged in a second layer of the photonic waveguide, wherein one of the first section and the second section comprises a plurality of periodic structures overlapping the other from a top-view perspective,
    wherein the first material is silicon, and the second material is silicon nitride.

12. The semiconductor device according to claim 11, wherein a pitch of the periodic structures is less than one half of a wavelength of the light divided by an effective refractive index of the first material.

13. The semiconductor device according to claim 11, further comprising a dielectric layer wrapping around the first section and second sections and used for separating the first section and the second section, wherein the first and second materials have respective first and second refractive indices, and the dielectric layer has a third refractive index, wherein the second refractive index is less than the first refractive index and greater than and the third refractive index.

14. The semiconductor device according to claim 11, wherein the first section and the second section are separated from each other and spaced by a spacing in a range between about 0.2 µm and 0.5 µm.

15. The semiconductor device according to claim 11, further comprising a transition coupler in the first section and the second section to couple the light between the first section and the second section.

16. The semiconductor device according to claim 11, wherein each of the periodic structures has rounded corners from a top-view perspective.

17. The semiconductor device according to claim 11, wherein the first section or the second section comprising the plurality of periodic structures arranged in parallel further comprises a plurality of inverted tapers extends through some of plurality of periodic structure.

18. A semiconductor device, comprising:
a first substrate comprising a first dielectric layer;
a second substrate bonded to the first substrate; and
a photonic waveguide arranged in the first substrate and the second substrate, wherein the photonic waveguide comprises:

a first section extending in a first direction in the first substrate and having a first refractive index, wherein the first section comprises a plurality of periodic structures, and the first dielectric layer wraps around the first section; and a second section extending in a second direction in the second substrate and having a second refractive index different from the first refractive index, wherein the second direction is different from the first direction, and the second section overlaps with the plurality of periodic structures of the first section from a top-view perspective, wherein the first dielectric layer has a third refractive index less than the first refractive index, and the second substrate comprises a second dielectric layer wrapping around the second section of the photonic waveguide and having a fourth refractive index less than the second refractive index.

19. The semiconductor device according to claim 18, wherein the first section further comprises a plurality of inverted tapers extends through some of plurality of periodic structure.

20. The semiconductor device according to claim 19, wherein the plurality of inverted tapers is non-overlapped with the second section from a top-view perspective.

* * * * *